(12) United States Patent
Okada (10) Patent No.: US 8,777,423 B2
(45) Date of Patent: Jul. 15, 2014

(54) PROJECTOR AND PROGRAM

(71) Applicant: Seiko Epson Corporation, Tokyo (JP)

(72) Inventor: Kazutoshi Okada, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/903,450

(22) Filed: May 28, 2013

(65) Prior Publication Data

US 2013/0258296 A1 Oct. 3, 2013

Related U.S. Application Data

(63) Continuation of application No. 12/349,898, filed on Jan. 7, 2009, now abandoned.

(30) Foreign Application Priority Data

Jan. 9, 2008 (JP) ................................. 2008-001999

(51) Int. Cl.
*G03B 21/20* (2006.01)
(52) U.S. Cl.
USPC .......................... 353/85; 351/307; 348/785 G
(58) Field of Classification Search
USPC ....................... 353/85, 122; 315/50, 291, 308
See application file for complete search history.

(56) References Cited

U.S. PATENT DOCUMENTS

| | | | |
|---|---|---|---|
| 5,136,397 A | | 8/1992 | Miyashita |
| 5,479,076 A | * | 12/1995 | Moberg ........................ 315/307 |
| RE36,060 E | | 1/1999 | Miyashita |
| 5,925,990 A | * | 7/1999 | Crouse et al. ................. 315/307 |
| 6,364,492 B1 | | 4/2002 | Fujimori et al. |
| 2004/0212787 A1 | * | 10/2004 | Kida et al. ...................... 353/94 |
| 2004/0251852 A1 | | 12/2004 | Kambara et al. |
| 2005/0052622 A1 | * | 3/2005 | Morishita ........................ 353/85 |
| 2006/0055893 A1 | * | 3/2006 | Tseng et al. .................... 353/85 |

FOREIGN PATENT DOCUMENTS

| | | |
|---|---|---|
| JP | U-56-128638 | 3/1955 |
| JP | A-03-145288 | 6/1991 |
| JP | A-2001-312000 | 11/2001 |

OTHER PUBLICATIONS

Feb. 17, 2011 Office Action issued in U.S. Appl. No. 12/349,898.
Aug. 18, 2011 Office Action issued in U.S. Appl. No. 12/349,898.
Apr. 4, 2012 Office Action issued in U.S. Appl. No. 12/349,898.
Feb. 26, 2013 Notice of Allowance issued in U.S. Appl. No. 12/349,898.
U.S. Office Action for U.S. Appl. No. 13/903,596 mailed Oct. 9, 2013.

* cited by examiner

*Primary Examiner* — Francis M Legasse, Jr.
*Assistant Examiner* — Jerry Brooks
(74) *Attorney, Agent, or Firm* — Oliff PLC (57) ABSTRACT

A projector includes a projection light source, a light-off detector that detects that the projection light source is shut off, and a relighting controller that carries out a relighting process for relighting the projection light source based on the detection performed by the light-off detector as a trigger.

13 Claims, 7 Drawing Sheets

FIG. 1

[SETTING INFORMATION]

| MAXIMUM PROCESS NUMBER | N |
|---|---|
| MAXIMUM RETRY NUMBER (STARTUP) | Ma |
| MAXIMUM RETRY NUMBER (NORMAL PROCESS) | Mb |

FIG. 2A

[LOG INFORMATION]

| 1. THE NUMBER OF LAMP ABNORMALITY STATES THAT HAVE OCCURRED |
|---|
| 2. TOTAL OPERATION PERIOD |
| 3. ABNORMALITY LOG |
| 4. THE NUMBER OF RELIGHTING PROCESSES |

$$\begin{cases} 0 & \cdots & aa \\ 1 & \cdots & bb \\ 2 & \cdots & cc \\ \vdots & & \\ Nm & \cdots & dd \end{cases}$$

| 5. THE NUMBER OF LIGHTING RETRY ACTIONS THAT HAVE BEEN CARRIED OUT UNTIL SUCCESSFUL LIGHTING |
|---|

STARTUP $$\begin{cases} 0 & \cdots & ee \\ 1 & \cdots & ff \\ 2 & \cdots & gg \\ \vdots & & \\ Nma & \cdots & hh \end{cases}$$

NORMAL PROCESS $$\begin{cases} 0 & \cdots & ii \\ 1 & \cdots & jj \\ 2 & \cdots & kk \\ \vdots & & \\ Nmb & \cdots & ll \end{cases}$$

PROJECTOR AND PROGRAM

CROSS-REFERENCE RELATED APPLICATIONS

This application claims priority to JP 2008-001999 filed in Japan on Jan. 9, 2008, the disclosure of which is hereby incorporated by reference in its entirety. In addition, this is a Continuation of application Ser. No. 12/349,898 filed Jan. 7, 2009. The disclosure of the prior application is hereby incorporated by reference in its entirety.

BACKGROUND

The present invention relates to a projector in which projection light from a projection light source projects an image on a projection object, and a program.

In the related art, when a projector detects that a projection light source fails to light up in response to a power-on action, the power-on action (lighting retry action) is repeated by a preset number of times at the maximum (for example, JP-A-2001-312000, paragraph [0014] and other paragraphs). In this case, failure in lighting the projection light source results from malfunction of the projection light source or abnormally large increase in internal temperature.

The failure in lighting the projection light source (shut off) may occur not only in the power-on action but also in a normal process (from the point when the projection light source successfully lights up for the first time after the power is turned on to the point when the power is turned off). For example, when the projector is operated in an area where the power supply condition is unstable, the projection light source could be abruptly shut off. In such a case, a projector of related art is cumbersome because it forces a user to manually carry out the power-on action again. In particular, in a ceiling-hanging projector (fixed type) having a reset button provided on a apparatus body, a user needs to lower the projector to a point where the user can manipulate it and then carry out the power-on action again, which requires a lot of labor and time.

SUMMARY

An advantage of some aspects of the invention is to provide a projector that can reduce the user's labor of carrying out the power-on action again when the projection light source of the projector is shut off, and a program.

A projector according to an aspect of the invention includes a projection light source, a light-off detector that detects that the projection light source is shut off, and a relighting controller that carries out a relighting process for relighting the projection light source based on the detection performed by the light-off detector as a trigger.

According to the above configuration, the relighting process for relighting the projection light source is automatically carried out when it is detected that the projection light source is shut off, the user does not need to manually carry out a power-on action again.

"The projection light source is shut off" means that the projection light source transits from the light-on state to the light-off state, and does not mean that the light-off state continues (the projection light source has been shut off). "The light-off detector" carries out its detection in a normal process that is a state from the point when the projection light source successfully lights up for the first time after the power is turned on to the point when the power is turned off. That is, when the first lighting process immediately after the power-on action is not successfully carried out, the subsequent period is not monitored by the light-off detector because the projection light source has not transited from the light-on state to the light-off state.

It is preferable that the projector described above further includes a storage unit that stores a maximum process number N (N is an integer greater than or equal to two) up to which the relighting process can be carried out. The relighting controller preferably counts the number of relighting processes carried out after the power-on action, carries out the relighting process N times at the maximum, and carries out error notification based on the (N+1)-th detection performed by the light-off detector as a trigger.

According to the above configuration, since a plurality of (N) relighting processes can be carried out, the user's labor of carrying out the power-on action again can be reduced even when an unstable power supplying state continues for a long period. Further, since an error is notified when the (N+1)-th light-off state is detected, the user can recognize that lamp abnormality occurs.

It is preferable that the projector described above further includes a maximum process number setting unit that sets the maximum process number N, and the storage unit rewrites the value of N in accordance with the setting in the maximum process number setting unit.

According to the above configuration, the maximum process number N can be set in accordance with the usage and requirements of the projector. Further, it is conceivable that an appropriate maximum process number N differs from apparatus to apparatus, and the user can set an appropriate maximum process number N in consideration of such a situation.

It is preferable that the projector described above further includes a process number learning unit that tabulates the numbers of relighting processes that have been carried out, and dynamically changes the maximum process number N stored in the storage unit based on the tabulation result.

According to the above configuration, an appropriate maximum process number N can be set for each apparatus without forcing the user to carry out manual operation by tabulating the numbers of relighting processes and learning how the relighting process is carried out.

As a learning method, it is conceivable, for example, to store an average value or a median value (the central value between the maximum and minimum values) of the numbers of relighting processes that have been carried out in the normal process as the maximum process number N, or to store the number of relighting processes that have most frequently appeared as the maximum process number N.

In the projector described above, it is preferable that the storage unit further stores a maximum retry number M (M is an integer greater than or equal to two) up to which a retry action of lighting the projection light source is allowed to be carried out in the relighting process, and the relighting controller counts the number of lighting retry actions that have been carried out during the execution of the relighting process, judges that the relighting process has failed when the projection light source does not light up even after the M lighting retry actions, and carries out the error notification process.

According to the above configuration, since a plurality of (M) lighting actions are repeated (the lighting retry actions are carried out) even when a single lighting action does not light the projection light source in the relighting process, the probability of failure of the relighting process, that is, the rate of occurrence of lamp abnormality can be lowered.

It is preferable that the projector described above further includes a maximum retry number setting unit that sets the maximum retry number M, and the storage unit rewrites the value of M in accordance with the setting in the maximum retry number setting unit.

According to the above configuration, the maximum retry number M can be set in accordance with the usage and requirements of the projector. Further, it is conceivable that an appropriate maximum retry number M differs from apparatus to apparatus, and the user can set an appropriate maximum retry number M in consideration of such a situation.

It is preferable that the projector described above further includes a retry number learning unit that tabulates the numbers of lighting retry actions that have been carried out until the projection light source successfully lights up, and dynamically changes the maximum retry number M stored in the storage unit based on the tabulation result.

According to the above configuration, an appropriate maximum retry number M can be set for each apparatus without forcing the user to carry out manual operation by tabulating the numbers of lighting retry actions and learning how the lighting action is carried out.

As a learning method, it is conceivable, for example, to store an average value or a median value (the central value between the maximum and minimum values) of the numbers of lighting retry actions as the maximum retry number M, or to store the number of lighting retry actions that have most frequently appeared as the maximum retry number M.

It is preferable that the projector described above further includes a temperature detector that detects the temperature of the projection light source, and the relighting controller does not carry out the relighting process when the light-off detector detects that the projection light source is shut off after the temperature detector detects a temperature higher than or equal to a predetermined value.

When an abnormally high temperature of the projection light source is detected, the projection light source is shut off in some cases from safety reasons. According to the above configuration, the relighting process will not be carried out in such a case (when it is detected that the projection light source is shut off due to detection of an abnormally high temperature), whereby safety is ensured.

A program according to another aspect of the invention causes a computer to serve as the portions of the projector described above.

Using the program can achieve a projector that can reduce the user's labor of carrying out the power-on action again when the projection light source is shut off.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
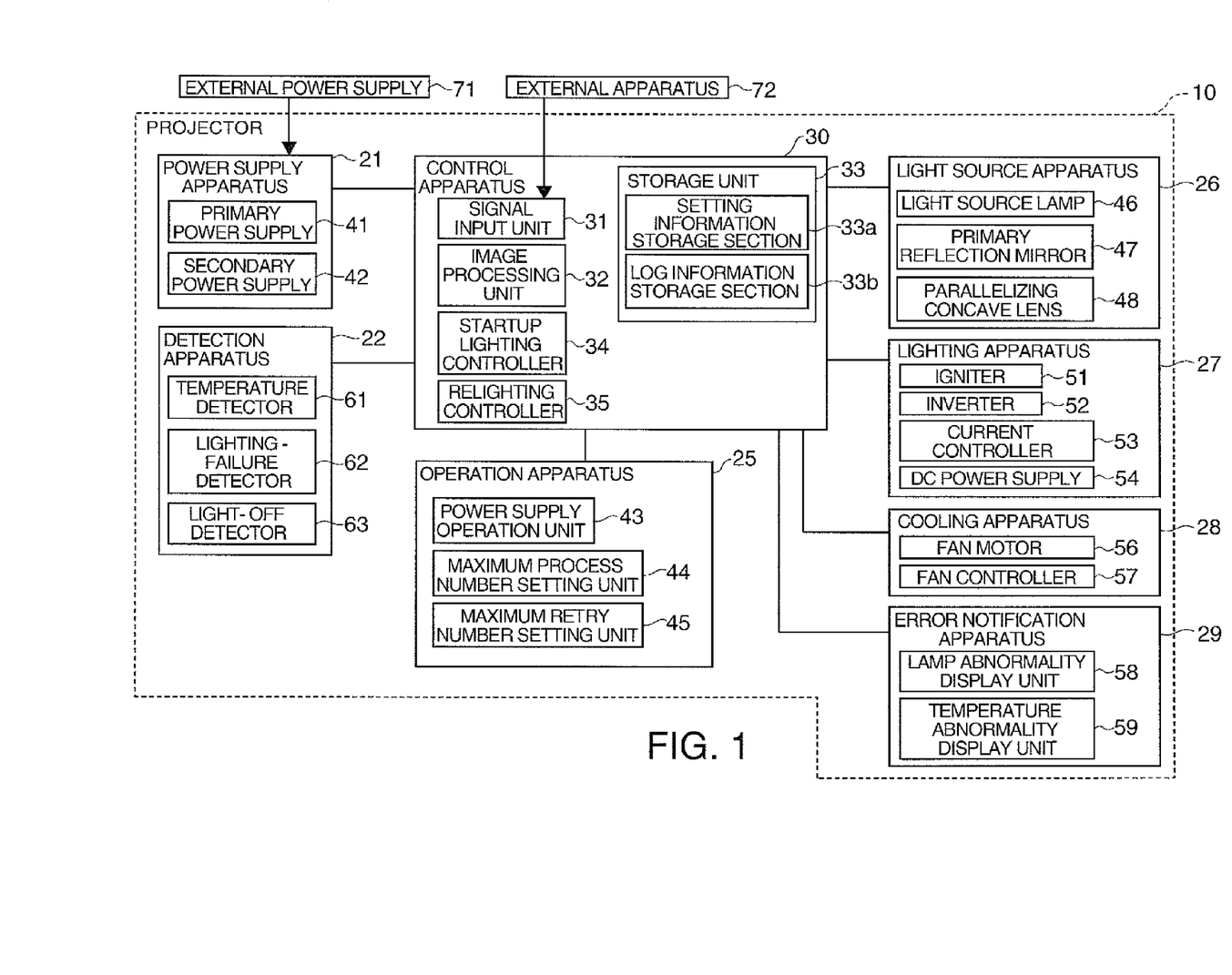
FIG. 1 is a block diagram of a projector according to a first embodiment.

A projector and a program according to an embodiment of the invention will be described below with reference to the accompanying drawings. FIG. 1 is a block diagram showing the configuration of a projector 10. As shown in FIG. 1, the projector 10 includes a power supply apparatus 21, a detection apparatus 22, an operation apparatus 25, a light source apparatus 26, a lighting apparatus 27, a cooling apparatus 28, an error notification apparatus 29, and a control apparatus 30.

The power supply apparatus 21 includes a primary power supply 41 that supplies electric power supplied from an external power supply 71 to the above portions in the projector 10, and a secondary power supply 42 that supplies the electric power supplied from the external power supply 71 only to the control apparatus 30 in a standby mode.

The detection apparatus 22 includes a temperature detector 61 that detects the temperature of the light source apparatus 26 (light source lamp 46) at predetermined time intervals, a lighting-failure detector 62 that detects that an lighting action carried out by the lighting apparatus 27 does not light the light source lamp 46, and a light-off detector 63 that detects that the light source apparatus 26 is shut off in a normal process (the light source apparatus 26 transits from the light-on state to the light-off state). When the "lighting-failure detector 62" detects lighting failure, a lighting retry action is repeated a maximum retry number of times at the maximum set by a user through an operation of the operation apparatus 25. "In the normal process" refers to being in a state starting from the point when a lighting process is successfully carried out for the first time after the primary power supply 41 is turned on to the point when the primary power supply 41 is turned off. A relighting process for relighting the light source apparatus 26, which will be described later in detail, is carried out based on the detection performed by the "light-off detector 63" as a trigger. The light-off state detected by the "light-off detector 63" conceivably results from unstable power supply to the power supply apparatus 26 (primary power supply 41) or other factors.

The operation apparatus 25 is implemented in the form of an operation panel or a remote controller (not shown) provided in a body of the projector 10. The operation apparatus 25 includes a power supply operation unit 43 through which the primary power supply 41 is turned on and off, a maximum process number setting unit 44 that sets how many times the relighting process can be carried out at the maximum in the normal process, and a maximum retry number setting unit 45 that sets how many times the lighting retry action can be repeated at the maximum in a single relighting process. The maximum process number setting unit 44 and the maximum retry number setting unit 45 can respectively set a maximum process number N that limits how many times the relighting process can be carried out and a maximum retry number M that limits how many times the lighting retry action can be carried out to integers greater than or equal to two. The setting is carried out by using an OSD (On Screen Display) capability to display a setting screen on the monitor (not shown) and increasing and decreasing a default value of each of the maximum process number N and the maximum retry number M.

The light source apparatus 26 includes the light source lamp 46 in which discharge between a pair of electrodes induces light emission, a primary reflection minor 47 comprised of an ellipsoidal reflector or a reflector having other shapes, and a parallelizing concave lens 48. The primary reflection mirror 47 collects and outputs light fluxes radiated from the light source lamp 46 in such a way that the exiting directions of the light fluxes are aligned to be oriented forward from the light source apparatus 26, and the parallelizing concave lens 48 parallelizes the light fluxes. A halogen lamp, a metal halide lamp, and a high-pressure mercury lamp can be used as the light source lamp 46. A "projection light source" in the claims refers to the light source lamp 46. The primary reflection mirror 47 is not necessarily an ellipsoidal reflector but a parabolic reflector that reflects and substantially parallelizes light fluxes emitted from the light source lamp 46. When a parabolic reflector is used, no parallelizing concave lens 48 is required.

The lighting apparatus 27 is provided to light the light source apparatus 26 under the control of the control apparatus 30 and includes an igniter 51, an inverter 52, a current controller 53, and a DC power supply 54. The igniter 51 includes a booster circuit and applies a high pulse voltage, when the light source lamp 46 is started, between the pair of electrodes to cause dielectric breakdown so that a discharge circuit is created. The inverter 52 and the current controller 53 are provided to supply a current having a predetermined electric power and a predetermined frequency to the light source lamp 46. Specifically, a switching device provided in the inverter 52 is driven in accordance with a signal from the control apparatus 30 to convert the direct current from the DC power supply 54 into a rectangular-wave alternate current having a predetermined frequency. The current controller 53 temporarily increases the magnitude of the current to be supplied to the light source lamp 46 in accordance with an instruction from the control apparatus 30. In the following description, "the action of lighting the light source lamp 46" refers to the series of actions described above.

The cooling apparatus 28 is provided to lower the temperature of the interior of the projector 10 (portions around the light source apparatus 26, in particular), and includes a fan motor 56 and a fan controller 57 that controls the fan motor 56. When the control apparatus 30 judges that the detection result from the temperature detector 61 indicates that the temperature is abnormally high, the fan controller 57 rotates the fan motor 56 at high speed in response to an instruction from the control apparatus 30 until the temperature in the projector 10 is lowered to a normal value. When the power supply operation unit 43 is operated to turn off the primary power supply 41, the fan controller 57 rotates the fan motor 56 for a predetermined period by using the power supplied from the secondary power supply 42 and then stops the operation of the fan motor 56.

The error notification apparatus 29 includes a lamp abnormality display unit 58 that displays abnormality of the light source lamp 46, if any, detected by the control apparatus 30, and a temperature abnormality display unit 59 that displays temperature abnormality, if any, detected by the control apparatus 30. Each of the lamp abnormality display unit 58 and the temperature abnormality display unit 59 notifies abnormality by lighting or blinking an LED provided for each type of information. As the error notification apparatus 29, in addition to notification by means of display, a loudspeaker may be provided to notify an error by means of audio (electronic sounds or audio guidance), or a communication unit may be provided to send a message indicative of abnormality to an administrator, for example, by means of LAN networking or electronic mailing.

The control apparatus 30 uses a CPU (Central Processing Unit) as a primary component to carry out centralized control of the portions in the projector 10. The control apparatus 30 includes a signal input unit 31, an image processing unit 32, a storage unit 33, a startup lighting controller 34, and a relighting controller 35.

The signal input unit 31 receives image data and control signals as inputs from an external apparatus 72, such as a personal computer and a video recorder. In this case, the signal input unit 31 is implemented in the form of an interface that receives RGB signals outputted from a personal computer or a composite signal outputted from a video recorder. The signal input unit 31 may alternatively be configured to acquire image data and other information from an external recording medium (not shown). In this case, the signal input unit 31 is implemented in the form of a memory card slot that reads a memory card or an optical disk drive that reads an optical disk.

The image processing unit 32 carries out predetermined image processing on the image data inputted to the signal input unit 31 based on a prestored image processing program. Examples of the predetermined image processing may include keystone distortion correction, image quality adjustment, image size adjustment, and gamma correction.

The storage unit 33 includes a setting information storage section 33a that stores the maximum process number N set by the maximum process number setting unit 44 and the maximum retry number M set by the maximum retry number setting unit 45, and a log information storage section 33b that stores log information. Each of the setting information storage section 33a and the log information storage section 33b is comprised of a non-volatile, rewritable memory, such as a flash ROM. Although not particularly illustrated, the projector 10 is also equipped with a memory, such as a non-rewritable ROM, in which a variety of control programs including the image processing program described above are stored.

The startup lighting controller 34 controls a startup lighting process, which is the first lighting process after the primary power supply 41 is turned on. The startup lighting controller 34 carries out the lighting process (startup lighting process) only once at the time of startup. When the lighting process has failed, the start-up lighting controller 34 instructs the lamp abnormality display unit 58 to display an error. In the startup lighting process, when the lighting action does not lead to successful lighting (when the lighting-failure detector 62 detects that the light source lamp 46 does not light up), the lighting retry action is repeated the maximum retry number (M) of times at the maximum, which is stored in the setting information storage section 33a. When the light source lamp 46 does not light up even after the M lighting retry actions, the startup lighting process is judged to fail.

The relighting controller 35 controls the relighting process in the normal process. The relighting controller 35 carries out the lighting process (relighting process) based on the detection performed by the light-off detector 63 as a trigger. The relighting process is carried out the maximum process number (N) of times at the maximum, which is stored in the setting information storage section 33a. Therefore, when the light-off detector 63 detects the (N+1)-th light-off state, it is judged that the light source lamp 46 malfunctions (the light source is burned-out, for example) and instructs the lamp abnormality display unit 58 to display an error. In the relighting process as well, when the lighting action does not lead to successful lighting, the lighting retry action is repeated the maximum retry number (M) of times, which is stored in the setting information storage section 33a. When the light source lamp 46 does not light up even after the M lighting retry actions, the relighting process is judged to fail.

In addition to the components described above, the projector 10 further includes an illumination optical apparatus that emits an illumination flux, a light modulator (liquid crystal panel) that modulates the light flux emitted from the illumination optical apparatus in accordance with image data to form image light, a color combining optical apparatus (cross dichroic prism) that forms a color image, and a projection optical apparatus that enlarges and projects the modulated image light. These other apparatus will not be described in detail because they can be implemented by applying existing technologies.

Figure 2A:
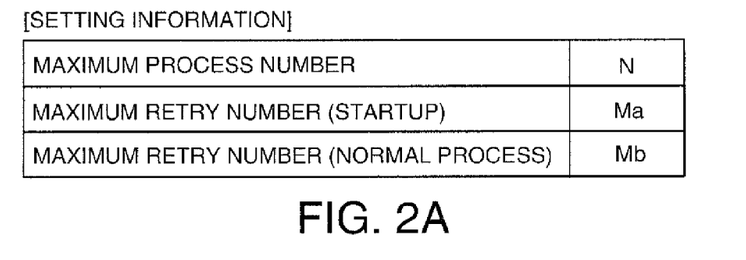
FIGS. 2A and 2B show setting information and log information stored in a storage unit.

The setting information and log information stored in the storage unit 33 will be described in detail with reference to FIGS. 2A and 2B. As described above, the setting information storage section 33a in the storage unit 33 stores the maximum process number N set by the maximum process number setting unit 44 and the maximum retry number M set by the maximum retry number setting unit 45. The maximum retry number M can be set for the startup process and the normal process separately. The setting information storage section 33a therefore stores the maximum process number N, the maximum retry number Ma for the startup lighting process, and the maximum retry number Mb for the relighting process as shown in FIG. 2A.

Figure 2B:
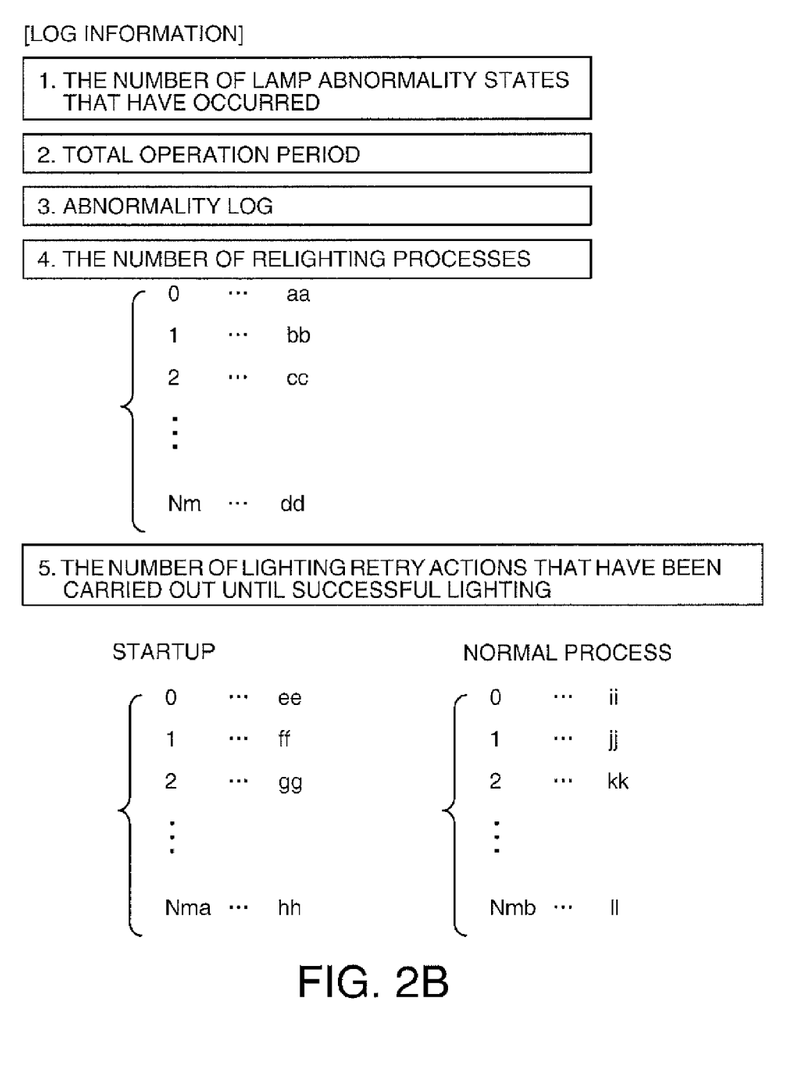

On the other hand, the log information storage section 33b in the storage unit 33 stores a variety of types of log information shown in FIG. 2B ("1. The number of lamp abnormality states that have occurred," "2. Total operation period," "3. Abnormal log," "4. The number of relighting processes," and "5. The number of lighting retry actions that have been carried out until successful lighting").

"1. The number of lamp abnormality states that have occurred" refers to the accumulated number representing how many times the lighting process has failed in the past startup processes and relighting processes, and corresponds to the number displayed on the lamp abnormality display unit 58. "2. Total operation period" refers to the accumulated working period of the projector 10 (the period when at least one of the primary power supply 41 and the secondary power supply 42 is working).

What is recorded as "3. Abnormal log" includes the type of abnormality (error) that occurs in the communication with the interior of the projector 10 or the external apparatus 72, and the elapsed time from the startup (when the primary power supply 41 is turned on) to the point when the abnormality occurs. In the projector 10 of the present embodiment, 16 latest abnormality logs are stored and referred at the time of failure and maintenance of the projector 10.

What is recorded as "4. The number of relighting processes" includes the histogram for the relighting processes that have been carried out in the past normal processes. That is, after the primary power supply 41 is turned on, the frequency representing how many times the light-off detector 63 detects the light-off state is recorded. For example, assuming that the maximum settable number as the maximum process number N is Nm, the histogram for the number of relighting processes, which ranges from zero to Nm, is recorded as follows: the number of normal processes in which no relighting process has been carried out in the past is aa, the number of normal processes in which one relighting process has been carried out in the past is bb, and so on. "4. The number of relighting processes" is used as a reference value when the user sets the maximum process number N. That is, "4. The number of relighting processes" can be accessed by the external apparatus 72 or referred through an operation of the operation apparatus 25.

What is recorded as "5. The number of lighting retry actions that have been carried out until successful lighting" includes the histogram for the number of lighting retry actions that have been carried out in the past startup lighting processes and the histogram for the number of lighting retry actions that have been carried out in the past relighting processes. That is, in each of the lighting processes, the frequency representing how many times the lighting-failure detector 62 detects lighting failure is recorded. For example, assuming that the maximum settable value as the maximum retry number Ma at the time of startup is Mma, the histogram for the number of lighting retry actions, which ranges from zero to Mma, is recorded as follows: the number of startup lighting processes in which no lighting retry action has been carried out is ee, the number of startup lighting processes in which one lighting retry action has been carried out in the past is ff, and so on.

Similarly, assuming that the maximum settable value that as the maximum retry action Mb in the normal process is Mmb, the histogram for the number of lighting retry actions, which ranges from zero to Mmb, is recorded as follows: the number of relighting processes in which no lighting retry action has been carried out is ii, the number of relighting processes in which one lighting retry action has been carried out in the past is jj, and so on. "5. The number of lighting retry actions that have been carried out until successful lighting", as in the case of "4. The number of relighting processes," can be accessed by the external apparatus 72 or referred through an operation of the operation apparatus 25, and used as a reference value when the user sets the maximum retry numbers Ma and Mb.

The startup process will be described with reference to the flowchart shown in FIG. 3 and the flowchart of a subroutine therein shown in FIG. 4. In the following flowcharts (FIGS. 3 to 6), the subject of each action is the projector 10 (control apparatus 30), and the sentences are written in passive voice as appropriate to avoid redundant description.

Figure 3:
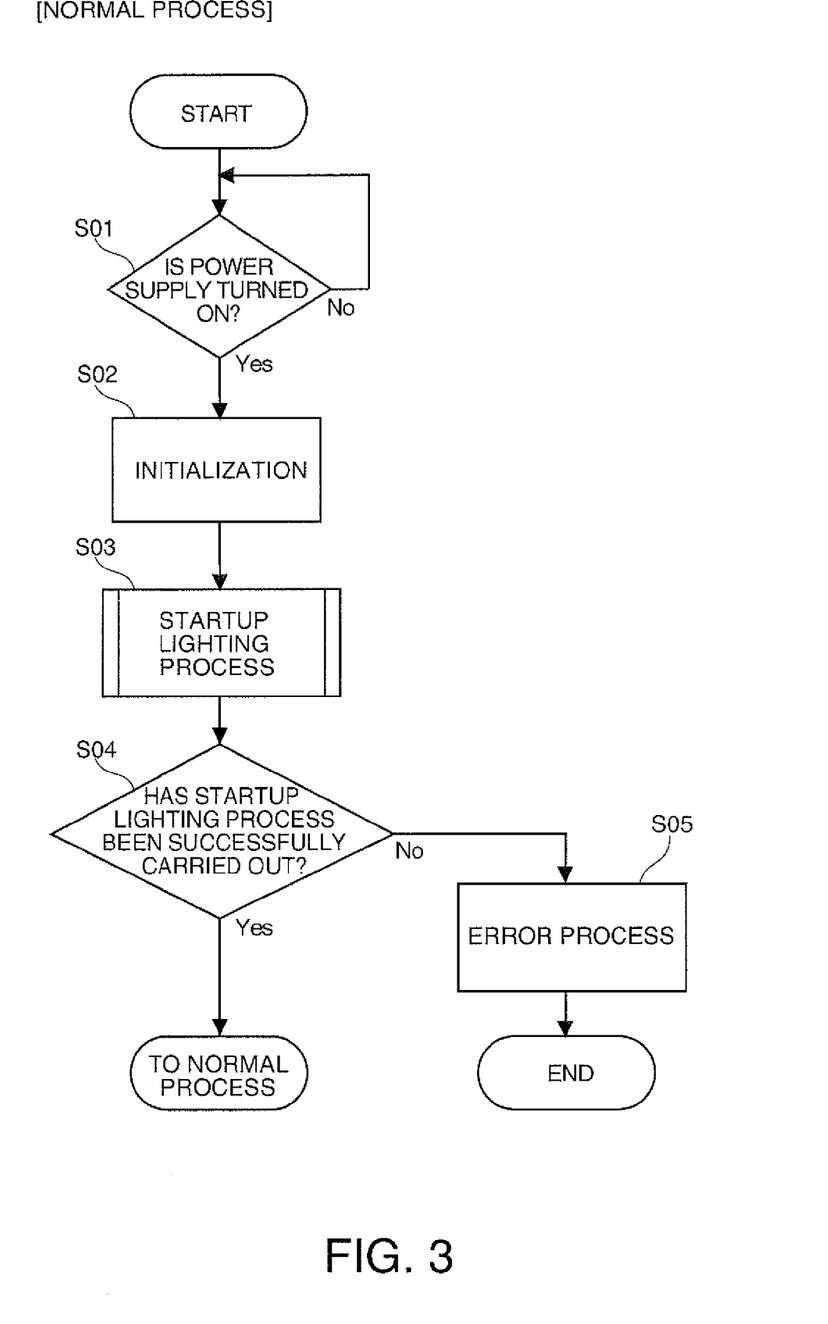
FIG. 3 is a flowchart showing a startup process of the projector.
Figure 4:
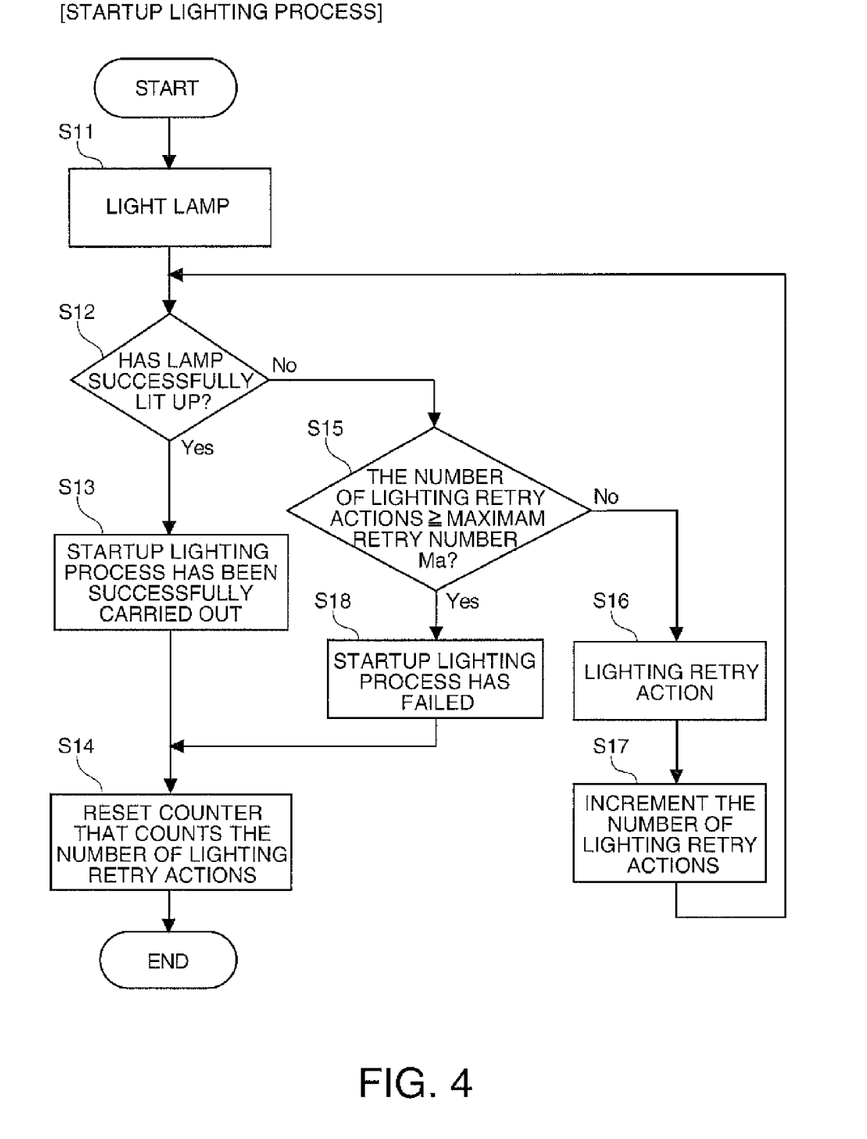
FIG. 4 is a flowchart showing a startup lighting process of the projector.

As shown in FIG. 3, when the primary power supply 41 is turned on (S01: Yes), the projector 10 carries out initialization, such as resetting a variety of flags and counter values (S02), and then carries out the startup lighting process (S03). When the startup lighting process is carried out and successfully done (when the light source lamp 46 lights up) (S04: Yes), the control proceeds to the normal process (see FIG. 5). On the other hand, when the startup lighting process has failed (when the light source lamp 46 does not light up even after the lighting retry action is repeated Ma times, which is the maximum retry number) (S04: No), error processes including displaying an error on the lamp abnormality display unit 58 (error notification process) are carried out (S05), and the startup process is terminated.

The startup lighting process, which corresponds to the step S03 in FIG. 3, will be described with reference to FIG. 4. The projector 10 first carries out, as the startup lighting process, the lighting action for lighting the light source lamp 46 by using the lighting apparatus 27 (S11). When the light source lamp 46 lights up (S12: Yes), it is judged that the startup lighting process has been successfully carried out (S13). A counter that counts the number of lighting retry actions is reset (S14), and the process is terminated.

On the other hand, when the light source lamp 46 does not light up even after the lighting action has been carried out (S12: No), it is judged whether or not the number of lighting retry actions is greater than or equal to the maximum retry number Ma (S15). When the number of lighting retry actions is smaller than the maximum retry number Ma (S15: No), the lighting retry action is carried out (S16), and the counter value representing the number of lighting retry actions is incremented by one (S17). The lighting retry action is then repeated (S12, S15 to S17). When the number of lighting retry actions reaches the maximum retry number Ma (S15: Yes), it is judged that the startup lighting process has failed (S18). The counter that counts the number of lighting retry actions is reset (S14) and the process is terminated.

Figure 5:
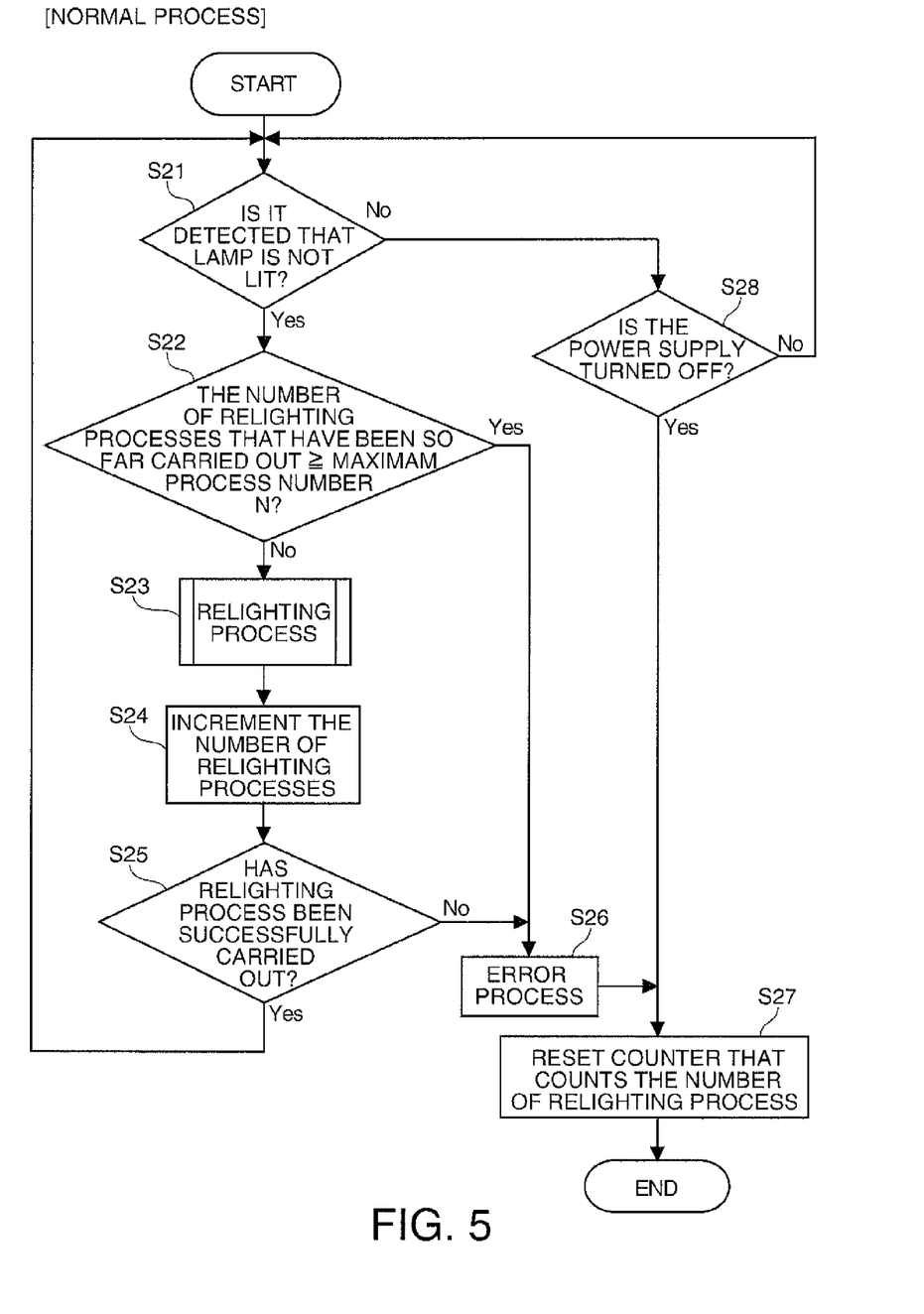
FIG. 5 is a flowchart showing a normal process of the projector.
Figure 6:
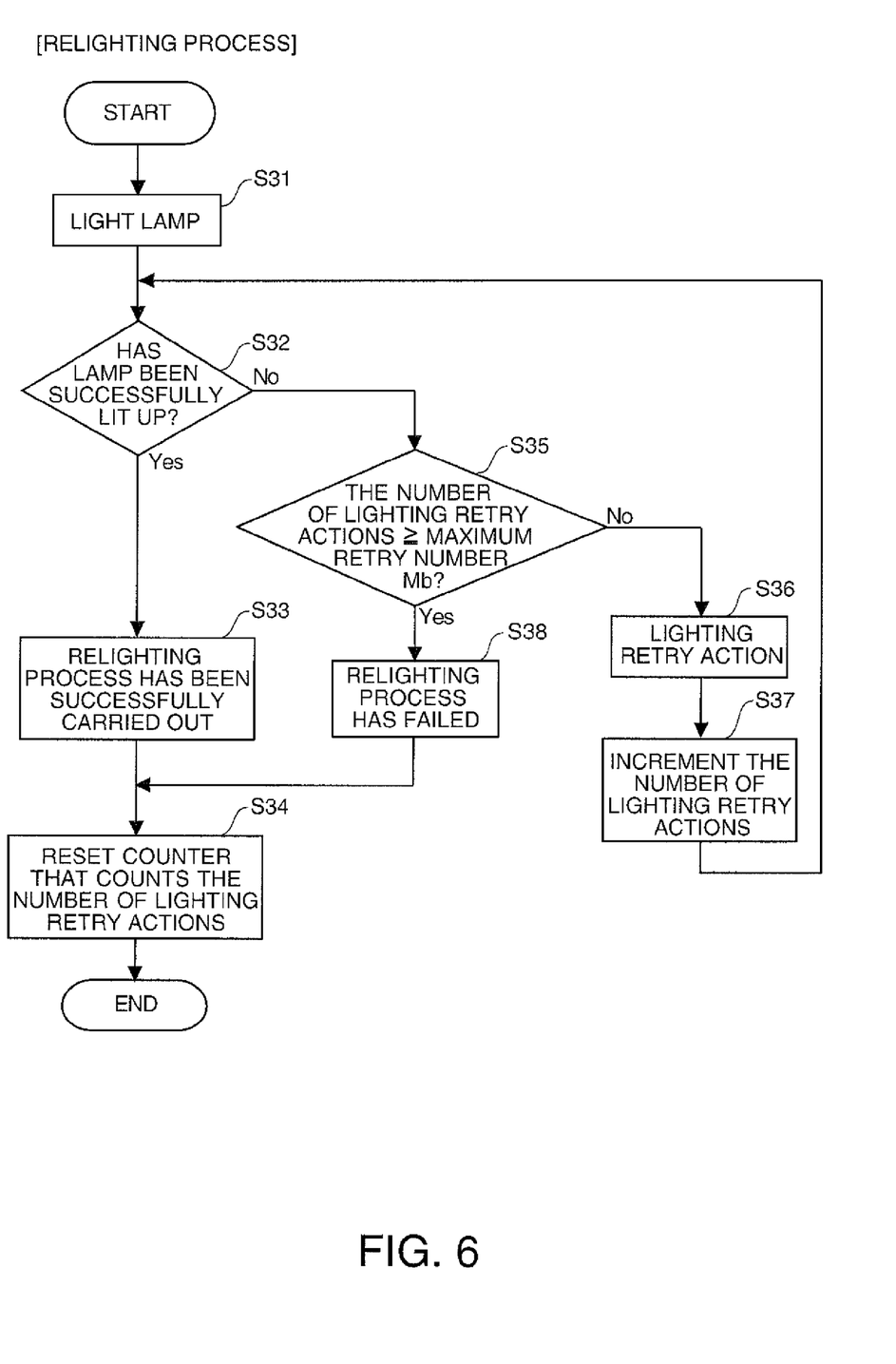
FIG. 6 is a flowchart showing a relighting process of the projector.

The normal process will be described with reference to the flowchart shown in FIG. 5 and the flowchart of a subroutine therein shown in FIG. 6. The normal process is a process to be carried out after the startup lighting process has been successfully carried out, and a process to be carried out in a state in which an image can be actually projected on a screen. As shown in FIG. 5, when the light-off detector 63 detects that the light source lamp 46 is not lit (S21: Yes), the projector 10 judges whether or not the number of relighting processes that have been so far carried out (carried out after the primary power supply 41 had been turned on) is greater than or equal to the maximum process number N (S22). When the number of relighting processes is smaller than the maximum process number N (S22: No), the relighting process is carried out (S23), and the counter value representing the number of relighting processes is incremented by one (S24). When the relighting process in the step S23 is successfully carried out (S25: Yes), the normal process is continued.

On the other hand, when the number of relighting processes reaches the maximum process number N (S22: Yes), error processes including displaying an error on the lamp abnormality display unit 58 (error notification process) are carried out (S26). A counter that counts the number of relighting processes is reset (S27), and the normal process is terminated. When the primary power supply 41 is turned off during the normal process (S28: Yes), the counter that counts the number of relighting processes is also reset (S27), and the normal process is terminated.

The relighting process that corresponds to the step S23 in FIG. 5 will be described with reference to FIG. 6. The relighting process has a procedure comprised of actions substantially the same as those in the startup lighting process shown in FIG. 4. That is, the projector 10 first carries out, as the relighting process, the lighting action for lighting the light source lamp 46 by using the lighting apparatus 27 (S31). When the light source lamp 46 lights up (S32: Yes), it is judged that the relighting process has been successfully carried out (S33). The counter that counts the number of lighting retry actions is reset (S34), and the process is terminated.

On the other hand, when the light source lamp 46 does not light up even after the lighting action has been carried out (S32: No), it is judged whether or not the number of lighting retry actions is greater than or equal to the maximum retry number Mb (S35). When the number of lighting retry actions is smaller than the maximum retry number Mb (S35: No), the lighting retry action is carried out (S36), and the counter value representing the number of lighting retry actions is incremented by one (S37). The lighting retry action is then repeated (S32, S35 to S37). When the number of lighting retry actions reaches the maximum retry number Mb (S35: Yes), it is judged that the relighting process has failed (S38). The counter that counts the number of lighting retry actions is reset (S34), and the process is terminated.

As described above, since the projector 10 of the present embodiment automatically carries out the relighting process for relighting the light source lamp 46 when it is detected that the light source lamp 46 is shut off due to an unstable power supply state or other factors, the user does not need to manually turn on the power supply again. Further, since the maximum process number N can be arbitrarily set in accordance with the usage and requirements of the projector 10, the projector 10 is a user-friendly apparatus. Moreover, since the number of relighting processes that have been carried out can be recorded as log information and referred to, the user can set an optimal maximum process number N for each apparatus.

Since the maximum retry numbers Ma and Mb up to which the lighting retry action is allowed to be repeated in the startup lighting process and the relighting process can be arbitrarily set, the projector 10 can be used in accordance with requirements of individual users. Further, since the frequency of the numbers of retry actions in the startup lighting process and the relighting process can also be recorded as log information, each of the maximum retry numbers Ma and Mb can be set to an optimal value for each apparatus.

While in the above embodiment, the maximum retry numbers Ma and Mb acceptable in each lighting process at the time of startup and in the normal process can be set individually, a single common value may be alternatively set. Still alternatively, the maximum retry number Ma in the startup lighting process may be a fixed value, whereas the user may set only the maximum retry number Mb in the relighting process.

While in the above embodiment, the relighting controller 35 carries out the relighting process when it is detected as a trigger that the light source lamp 46 is shut off, the relighting process may be carried out when a certain condition is satisfied. For example, when the light-off detector 63 detects that the light source lamp 46 is shut off after the temperature detector 61 has detected a temperature higher than a predetermined value, the relighting process may not be carried out. That is, the relighting process may be carried out only when the temperature detected by the temperature detector 61 is lower than the predetermined temperature. When an abnormally high temperature is detected in the projector (around the light source apparatus 26, in particular), the light source lamp 46 is shut off in some cases from safety reasons. According to the above configuration, the relighting process will not be carried out in such a case (when it is detected that the light source lamp 46 is shut off due to detection of an abnormally high temperature), whereby safety is ensured. When it is detected that the light source lamp 46 is shut off, but the execution of the relighting process is terminated due to detection of an abnormally high temperature, it is preferable, for example, that the cooling apparatus 28 rotates the fan motor 56 at high speed to quickly cool the interior of the projector.

Alternatively, the relighting process may be carried out only when "the power supplying state is unstable." In this case, the state of supplying power to the power supply apparatus 21 is monitored, and the relighting process is carried out when it is detected that the power supplying state is unstable and that the light source lamp 46 is shut off.

A second embodiment of the invention will be described with reference to FIG. 7. While in the first embodiment described above, the maximum process number N and the maximum retry numbers Ma, Mb set through an operation of the operation apparatus 25 are stored as setting information, the present embodiment differs in that the setting information is dynamically changed based on log information. The points different from the first embodiment will be primarily described below.

Figure 7:
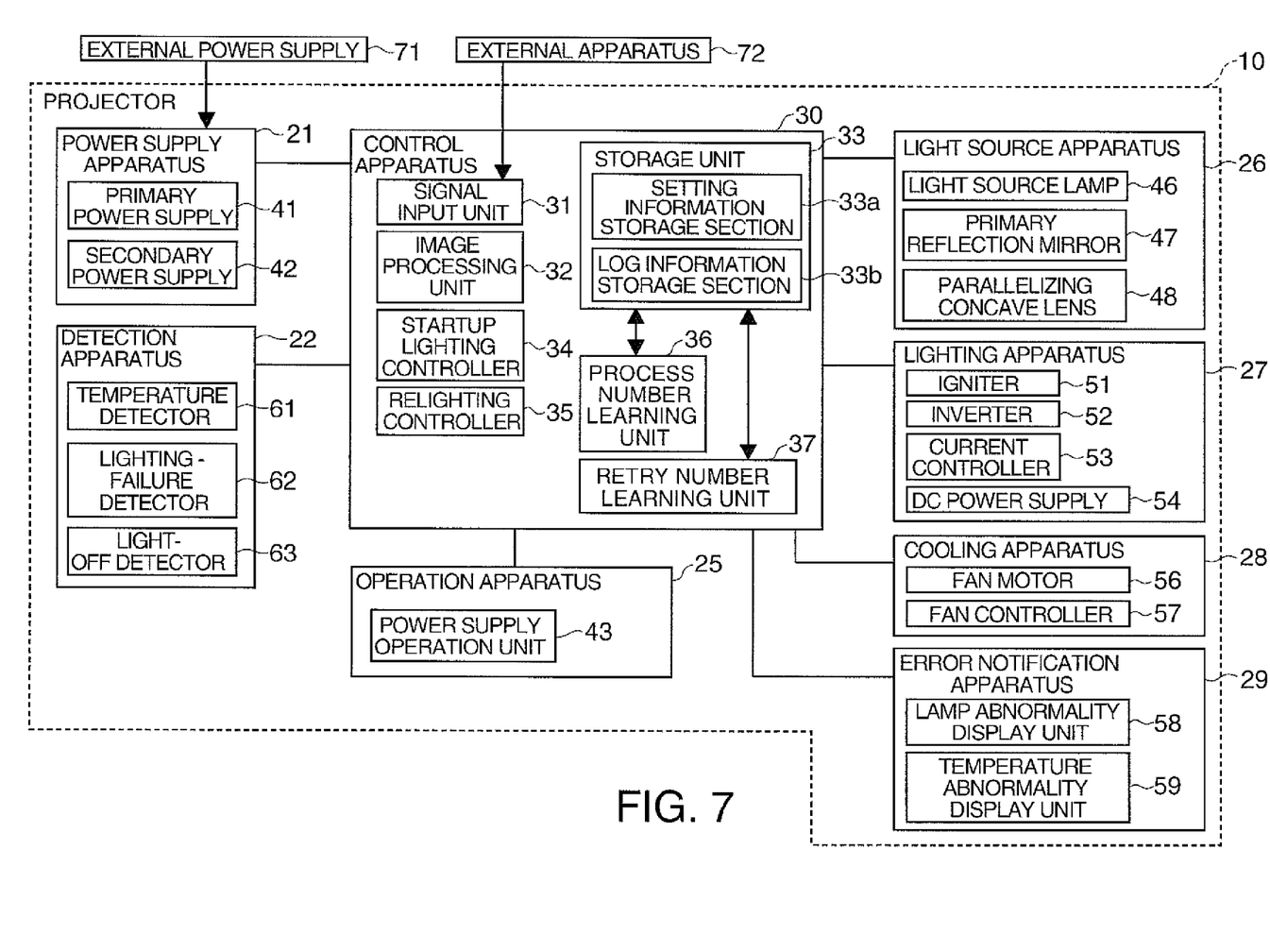
FIG. 7 is a block diagram of a projector according to a second embodiment.

As shown in FIG. 7, a projector 10 according to the present embodiment differs from the projector 10 according to the first embodiment shown in FIG. 1 in that the maximum process number setting unit 44 and the maximum retry number setting unit 45 are omitted from the operation apparatus 25 but a process number learning unit 36 and a retry number learning unit 37 are newly added into the control apparatus 30.

The process number learning unit 36 tabulates the numbers of relighting processes that have been carried out and dynamically changes the maximum process number N stored in the setting information storage section 33a based on the tabulation result. "Dynamically changing the maximum process number N" specifically refers to averaging the tabulated values of "4. The number of relighting processes" recorded as log information (see FIG. 2B). Therefore, when the average of the numbers of relighting processes that have been carried out is calculated to be, for example, three, the relighting process is repeated three times at the maximum, and the error processes are carried out when a fourth light-off state is detected.

The retry number learning unit 37 tabulates the numbers of lighting retry actions that have been carried out until the light source lamp 46 successfully lights up separately in the startup process and the normal process, and dynamically changes the maximum retry numbers Ma and Mb stored in the setting information storage section 33a based on the tabulation result. "Dynamically changing the maximum retry numbers Ma and Mb" specifically refers to averaging the tabulated values of "5. The number of lighting retry actions that have been carried out until successful lighting" recorded as log information (see FIG. 2B). Therefore, when the average of the numbers of lighting retry actions that have been carried out is calculated to be, for example, five, the lighting retry action is repeated five times at the maximum. When the light source lamp 46 does not light up even after five lighting retry actions, it is judged that the lighting process has failed.

The timing when "the number of relighting processes that have been carried out" and "the number of lighting retry actions in the startup process and the normal process" are tabulated and the timing when the data stored in the setting information storage section 33a is rewritten (the timing when the maximum process number N and the maximum retry numbers Ma and Mb are changed) may be at the time of power-on as a trigger, or the above operations may be carried out at predetermined operation time intervals or when a predetermined instruction is received from the operation apparatus 25 or the external apparatus 72.

As the learning method, instead of averaging the numbers of relighting processes and the numbers of lighting retry actions as described above, the median value of the above numbers (the central value between the maximum and minimum values) may be calculated, or the number of relighting processes and the number of lighting retry actions that have most frequently appeared may be determined as the maximum process number N and the maximum retry numbers Ma and Mb. Alternatively, as the learning method, the user may specify one of the plurality of candidates.

As described above, according to the second embodiment, an appropriate maximum process number N and maximum retry number M can be set for each apparatus without forcing the user to carry out manual operation by tabulating the numbers of relighting processes and the numbers of lighting retry actions and learning how the relighting process and the lighting action are carried out.

In the second embodiment as well, the number of lighting retry actions in the startup process and the normal process may be learned as a whole, and the value of a common maximum retry number M may be stored in the setting information storage section 33a. Further, in the second embodiment as well, when it is detected that the light source lamp 46 is shut off due to detection of an abnormally high temperature, it is preferable that the relighting process is not carried out.

While the second embodiment has a configuration without the maximum process number setting unit 44 and the maximum retry number setting unit 45, it is conceivable to employ a configuration in which the user uses a learned maximum process number N and maximum retry number M as default values to set a preferred maximum process number N and maximum retry number M.

Each of the components in the projector 10 shown in the two embodiments described above can be provided as a program. Such a program can be stored on any of a variety of recording media (such as a CD-ROM and a flash memory) to be provided. That is, the scope of invention encompasses a program that causes a computer to serve as each portion of the projector 10, and a recording medium on which the program is recorded.

While the above embodiments employ a liquid crystal display method, any other display principles may be employed, such as a CRT display method and a light-switch display method (a method using a micromirror device). Further, the above embodiments can be changed as appropriate to the extent that such changes do not depart from the spirit of the invention.

What is claimed is:

1. A projector comprising:
a projection light source;
a light-off detector that detects that the projection light source has transitioned from an "on" state to an "off" state;
a relighting controller that carries out a relighting process for relighting the projection light source each time the light-off detector detects that the projection light source has transitioned from the "on" state to the "off" state for a maximum process number of times N (N is an integer greater than or equal to two) up to which the relighting process can be carried out; and
a storage unit that stores the maximum process number N,
wherein the relighting controller counts the number of relighting processes carried out for a maximum of N times, and wherein, when the light-off detector detects the (N+1)-th transition from the "on" state to the "off" state, the relighting controller carries out error notification based.

2. The projector of claim 1, further comprising:
a maximum process number setting unit that sets the maximum process number N,
wherein the storage unit rewrites the value of N based on the maximum process number N set by the maximum process number setting unit.

3. The projector according to claim 1, wherein
the storage unit further stores a maximum retry number M (M is an integer greater than or equal to two) up to which a retry action of lighting the projection light source is allowed to be carried out in the relighting process, and
the relighting controller counts the number of lighting retry actions that have been carried out during the execution of the relighting process, judges that the relighting process has failed when the projection light source does not light up after the M lighting retry actions, and carries out the error notification.

4. The projector according to claim 3, further comprising:
a maximum retry number setting unit that sets the maximum retry number M,
wherein the storage unit rewrites the value of M in accordance with a setting in the maximum retry number setting unit.

5. The projector according to claim 1, further comprising:
a temperature detector that detects a temperature of the projection light source,
wherein the relighting controller does not carry out the relighting process when the light-off detector detects that the projection light source is shut off after the temperature detector detects that the temperature is higher than or equal to a predetermined value.

6. The projector according to claim 1, wherein the light-off detector detects that the projection light source is shut off during a normal process, the normal process being a time period between a point when the projection light source lights up for a first time after power is turned on to a point when the power is turned off.

7. The projector according to claim 1, wherein the light-off detector detects that the projection light source is shut off during a light on state of the projection light source.

8. A method of relighting a projection light source of a project, the method comprising:
    detecting that the projection light source has transitioned from an "on" state to an "off" state;
    carrying out a relighting process for relighting the projection light source with each detection that the projection light source has transitioned from the "on" state to the "off" state for a maximum process number of times N (N is an integer greater than or equal to two) up to which the relighting process can be carried out;
    storing the maximum process number N; and
    counting the number of relighting processes carried out for a maximum of N times, and carrying out error notification when the (N+1)-th transition from the "on" state to the "off" state is detected.

9. The method according to claim 8, further comprising:
    setting the maximum process number N, and rewriting the set value of N that is stored.

10. The method according to claim 8, the method further comprising:
    storing a maximum retry number M (M is an integer greater than or equal to two) up to which a retry action of lighting the projection light source is allowed to be carried out; and
    counting the number of lighting retry actions that are carried out during the execution of the relighting process, determining that the relighting process failed when the projection light source does not light up after the M lighting retry actions, and carrying out the error notification.

11. The method according to claim 10, further comprising:
    setting a maximum retry number, and rewriting the value of M in memory based on the set maximum retry number.

12. The method according to claim 8, further comprising:
    detecting a temperature of the projection light source, wherein the relighting process is not carried out when the projection light source is detected to be shut off after detecting that the temperature is higher than or equal to a predetermined value.

13. A system for relighting a projection light source of a projector, the system comprising:
    means for detecting that the projection light source has transitioned from an "on" state to an "off" state;
    means for carrying out a relighting process for relighting the projection light source each time the light-off detector detects that the projection light source has transitioned from the "on" state to the "off" state for a maximum process number of times N (N is an integer greater than or equal to two) up to which the relighting process can be carried out; and
    means for storing the maximum process number N,
    wherein the means for carrying out the relighting process counts the number of relighting processes carried out for a maximum of N times, and carries out error notification when the means for detecting detects the (N+1)-th transition from the "on" state to the "off" state.

* * * * *